Sept. 2, 1924.  
B. F. SHIELDS ET AL  
SPRING BRAKE  
Filed Dec. 20, 1921

INVENTORS  
Benjamin F. Shields  
Charles G. Crombie  
George A. Windell  
BY ATTORNEY  
Fred C Mathews Sept. 2, 1924.

B. F. SHIELDS ET AL 1,507,034

SPRING BRAKE

Filed Dec. 20, 1921

INVENTORS
Benjamin F. Shields
Charles G. Crombie
George A. Windell
BY ATTORNEY
Fred C Matheny

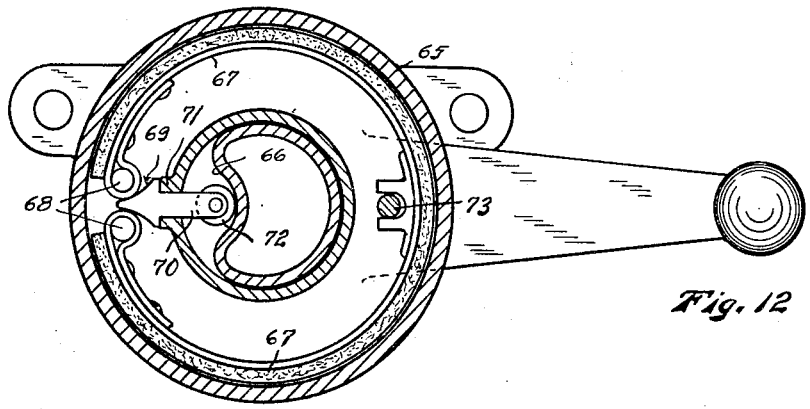
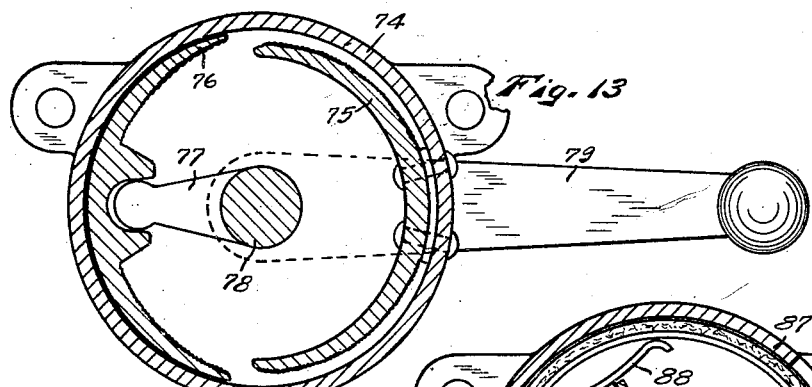
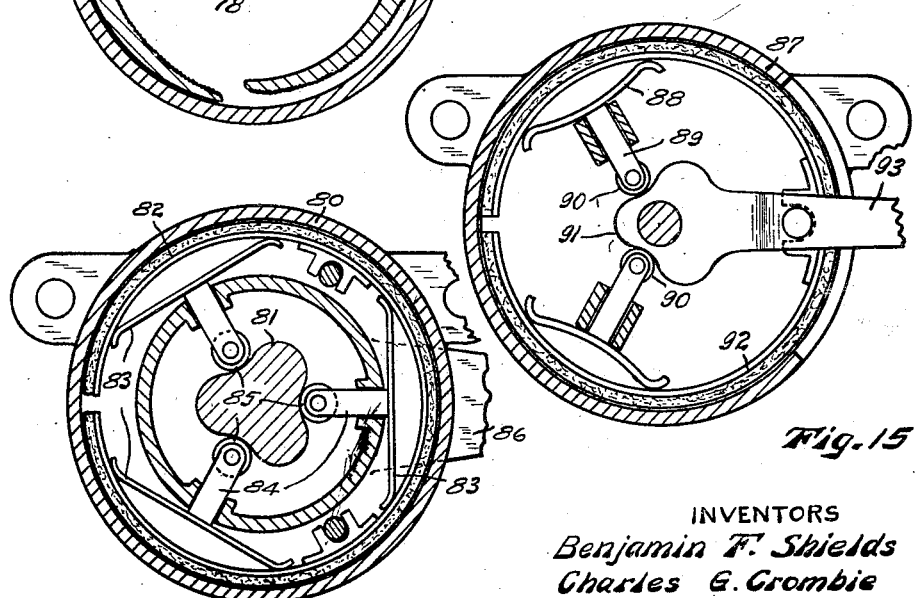

Patented Sept. 2, 1924.

1,507,034

UNITED STATES PATENT OFFICE.

BENJAMIN F. SHIELDS, CHARLES G. CROMBIE, AND GEORGE A. WINDELL, OF SEATTLE, WASHINGTON.

SPRING BRAKE.

Application filed December 20, 1921. Serial No. 523,701.

*To all whom it may concern:*

Be it known that we, BENJAMIN F. SHIELDS, CHARLES G. CROMBIE, and GEORGE A. WINDELL, citizens of the United States, residing at Seattle, in the county of King and State of Washington, have invented certain new and useful Improvements in Spring Brakes, of which the following is a specification.

This invention relates to improvements in spring brakes or devices for absorbing excess deflection and rebound of the springs of motor vehicles and is an improvement on the spring brake or shock absorber disclosed in the application of Benjamin F. Shields, Serial Number 435,093, filed Jan. 5, 1921. The object of this improvement is to provide a spring brake of this nature that will have, in its operation, a neutral zone in which it will not exert any retarding effect on the spring with which it is connected but will leave the spring absolutely free to operate in the usual manner, the neutral or ineffective zone of the spring brake corresponding to the movement or flexure of the spring under normal operation and the spring brake being arranged to exert a retarding or brake effect in response to excess deflection or an excess upward throw of the spring.

Vehicle springs of the type used on automobiles are ordinarily constructed so that when they are subjected to a normal load and are working under normal conditions they will operate more smoothly and with greater efficiency if they are left entirely free than they will if they are hampered and their free and easy movement is interfered with by attachments of the usual form known as shock absorbers, snubbers and the like.

All of the shock absorbers, snubbers and like devices with which we are familiar at the present time operate in such a manner as to hamper the free and easy movement of the vehicle springs when they are working under normal load and normal conditions. Some of these devices tend to exert a retarding action as soon as any movement or deflection of the vehicle spring from its normal loaded position begins and continue to retard the deflection of the spring with increasing force as its deflection increases, thereby having the effect of adding to the stiffness of the spring and causing the vehicle body to ride less easily and less smoothly. This type of device usually is arranged to absorb recoil or rebound of the vehicle body after a deflection of the spring, thus making the springs work much more slowly even under ordinary normal deflections than they otherwise would. Another class of shock absorbing devices known as the snubber type permit the spring to deflect freely but catch it at the point of greatest deflection and exert a retarding effect throughout the entire recoil movement of the spring, thus failing to reinforce the spring when it is deflected more than the normal amount and slowing up the action of the spring by exerting a retarding effect throughout the entire recoil stroke.

This invention overcomes the objections above pointed out by providing a spring brake that will operate freely and without retarding the action of the vehicle spring as long as such vehicle spring is working under normal load and normal conditions and is only subjected to normal deflection and rebounding movements but that will begin to exert a retarding or brake effect on the spring as soon as the movements of deflection or the rebounding movements are in excess of a predetermined normal, such spring brake being arranged to retard the rebound or upward throw of the spring after an excessive deflection but to release as soon as the spring comes again within the limits of its normal movement or within the neutral zone and to again take hold to check excess rebound or upward throw of the vehicle body if the rebound continues entirely through the neutral zone and exceeds the predetermined limit of normal movement.

The ordinary vehicle spring is constructed to support a certain known load and to vibrate freely, easily and smoothly between certain limits, the space between such limits being herein termed the neutral zone of operation of the spring. When the spring is deflected beyond the limit of the neutral zone it will ordinarily rebound with excessive force, thus rendering the vehicle unpleasant and dangerous to ride in and sometimes resulting in the breaking of the springs or other parts of the vehicle. This spring brake does not affect the normal operation of the vehicle spring in any way within the neutral zone but acts as an instantaneous and positive brake on such spring if the deflection or the rebound of the spring exceeds the limits of the neutral zone.

By operating in the manner above described this spring brake serves to reinforce and stiffen the vehicle spring only in case of an unusually severe shock and to absorb rebound only when such rebound is in excess of the normal.

This spring brake is readily adjustable so that it may be set to take hold and release at any point in the movement of the spring, thereby making the spring brake readily adaptable to springs and vehicles of different size, weight and strength.

This spring brake is simple and strong in construction, reliable and efficient in operation, neat in appearance, not expensive to manufacture and easy to install on vehicles having springs of the ordinary type of construction.

Other advantages in the form of construction and arrangement of parts of the device will be apparent from the following description taken in connection with the accompanying drawings.

In the accompanying drawings Figure 1 is a view in side elevation showing this spring brake as it may appear when installed.

Figs. 12, 13, 14 and 15 are sectional views showing four different modifications of the invention.

Figure 5:
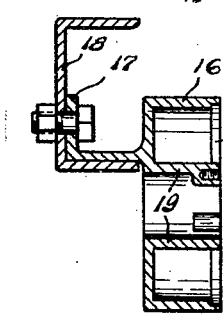
Fig. 5 is a sectional view showing bracket means for securing the housing of the spring brake to the inside of a frame channel.

Referring to the drawings, throughout which like reference numerals designate like parts; the numeral 16 designates a cylindrical housing or drum having lugs 17 by which it may be secured to the frame channel 18 of a motor vehicle, said lugs 17 preferably being substantially flush with the rear side of the housing 16 if the housing is to be secured to the outer side of the channel 18 and being offset to the rear of such housing as shown in Fig. 5 if the housing is to be secured to the inner side of the channel 18.

Figure 1:
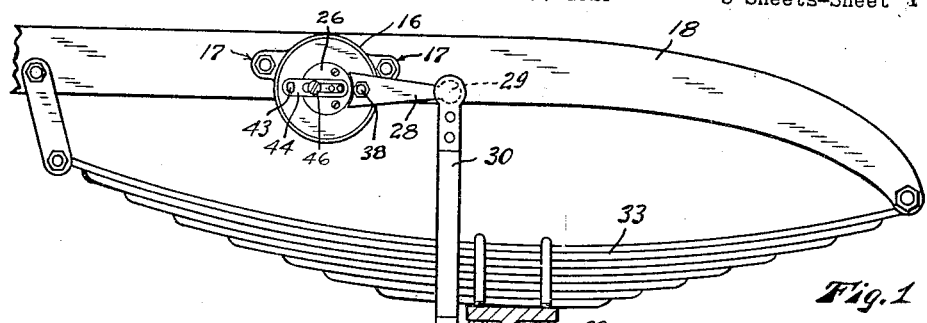

It will be understood that the spring brake may be connected in many different ways with motor vehicle springs and frames, or with relatively vibratory parts of mechanical devices, Fig. 1 only showing one typical installation of the same.

The interior of the housing 16 is provided with a centrally arranged integrally formed cylindrical bearing member or hub 19 on which the tubular portion 20 of a brake shoe supporting bracket is rotatably mounted.

The tubular bracket portion 20 is provided at the outer end with an outwardly directed annular flange 21 that is arranged to fit within a circular groove or rabbet 22 in the edge of the drum 16, and at the inner end with two diametrically opposite lugs 23 and 24 that are each provided with a perforation 25 that is disposed in alignment with a corresponding perforation in the flange 21.

The brake shoe supporting bracket is retained within the housing 16 by a disk 26 that fits within an annular groove or rabbet in the inner circumferential portion of the flange 21 and is rigidly secured to the tubular hub portion 19 of the housing by screws 27, thereby leaving the brake shoe supporting bracket free to turn within the housing 16.

The annular flange 21 of the brake shoe supporting bracket is provided with an integral or otherwise rigidly connected lever arm 28 that terminates in a ball 29 and is arranged to be connected as by a link 30 and clamp bracket 31 with an axle 32 upon which rests a spring 33 that supports the frame member 18, the arrangement being such as to cause oscillation of the brake shoe supporting bracket in response to relative movement between the frame member 18 and the axle 32.

Disposed within the housing or drum 16 between the end flange 21 and the lugs 23 and 24 are two semi-circular brake shoes 34 that terminate at one end in flattened parallel surfaces 35 between which are interposed a cam 36 and at the other end in flattened convergent surfaces 37 between which are interposed a tapered pin 38 that is threaded through the flange 21 and is provided with a lock nut 39 so that the position of the brake shoes may be adjusted with respect to the interior surface of the drum 16 with which they are arranged to engage by projecting the tapered pin further into or withdrawing it from between the inclined ends of the adjacent brake shoes.

The brake shoes are covered with the usual brake lining 40 having a high coefficient of friction and the cam 36 is flattened on opposite sides as shown so that when it is turned the brake shoes will be expanded and the linings 40 caused to frictionally engage with the inner surface of the drum 16. The brake shoes are ordinarily adjusted by moving the tapered pin 38 so that they rest very lightly against or just clear of the walls of the drum 16 and will permit a certain amount of turning of the cam 36 in either direction before they begin to bind upon the walls of said drum and exert a retarding action, thus leaving the vehicle spring on which they are installed free and unhampered under ordinary operation but being ready to exert their brake force to prevent an excessive deflection or rebound of the vehicle spring.

The interior wall of the drum 16 is machined to a true circle and the brake shoes 34 are of proper curvature so that the lining members 40 will fit the drum accurately and evenly and make contact throughout their entire length.

The ends of the cam 36 are provided with bearing studs 41 that are journaled in hardened bearing members 42 in the flange 21 and in the lug 23 and the outer bearing stud 41 terminates in a flattened end portion 43 that projects through a correspondingly shaped opening in a lever arm 44 by which the cam may be turned.

The lever arm 44 has a slot 45 extending lengthwise thereof that is slidable on a screw 46 which is screwed into and is rigid with the disk 26 at a point removed from the center thereof so that when the operating lever 28 is oscillated the lever arm 44 will be turned at a different angle and will thereby turn the cam 36 and expand the brake shoes. The disk 26 has several holes 47 disposed at different distances from the center for the reception of the screw 46 to afford adjustments for turning the lever arm 44 through different angles in response to a predetermined angular movement of the lever arm 28. The turning movement imparted to the cam 36 relative to the angular movement of the operating lever 28 will vary directly as the distance of the screw 46 from the center of the disk 26.

Figure 9:
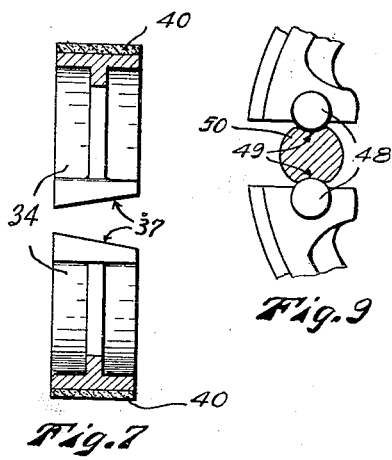
Fig. 9 is a fragmentary view of a modified form of a detail of the invention.
Figure 8:
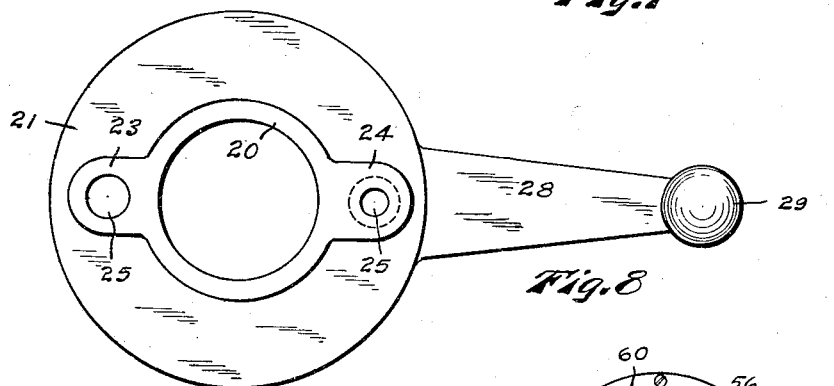
Fig. 8 is a detached plan view of a detail of the invention.

In Fig. 9 we have shown the ends of the brake shoes 34 as provided with bearing plugs 48 of hardened metal, the peripheral portions of which protrude slightly from the flattened end surfaces of the brake shoes and are arranged to fit within grooves 49 in the sides of a cam 50 that corresponds in purpose and function to the cam 36 and that serves to move the ends of the two brake shoes apart when it is turned.

The housing 16 and disk 26 are relatively fixed members while the brake shoes 34 and the bracket that carries such brake shoes are movable within the housing, the brake linings 40 being arranged to frictionally engage with the internal surface of the housing drum 16.

The brake shoes are adjusted by movement of the tapered pin 38 so that when the vehicle is at rest under an average load the lining members 40 will not be expanded and will rest very lightly against the walls of the drum 16, or will be barely clear of such walls, thus allowing the brake shoes and parts connected therewith to move freely for a limited distance in either direction before sufficient turning movement will be imparted to the cam 36 by the lever 44 to cause the brake lining members 40 to be firmly applied to the drum 16 and a retarding force exerted. Wear of the brake lining members 40 may be compensated for by adjustment of the tapered pin 38.

Figure 6:
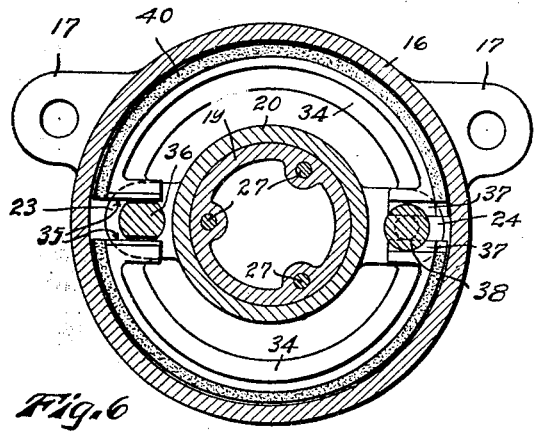
Fig. 6 is a sectional view substantially on a broken line 6, 6 of Fig. 3.
Figure 7:
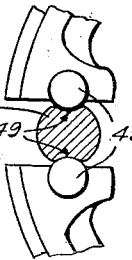
Fig. 7 is a sectional view of internal brake members or shoes showing certain parts in elevation.

The flattened surfaces 35 of the brake shoes against which the cam 36 operates will preferably be formed of hardened pieces of steel or similar material that are welded or otherwise rigidly secured to the ends of the brake shoes 34 as shown in Fig. 6.

Figure 2:
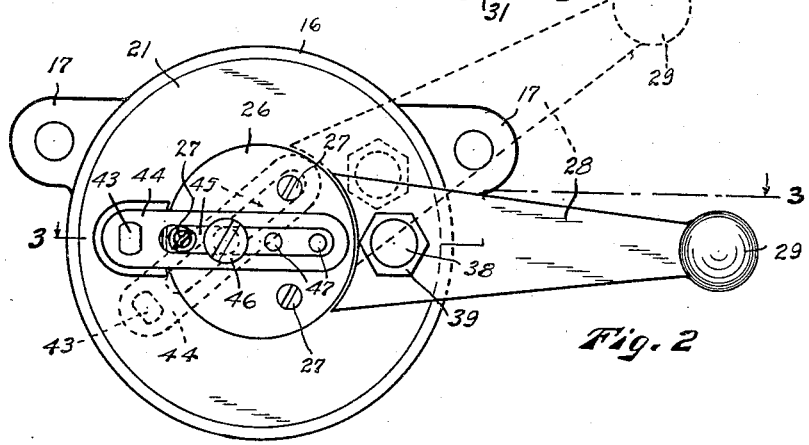
Fig. 2 is a detached view in elevation of the spring brake, certain operative positions that parts of the same may assume being shown by broken lines.
Figure 4:
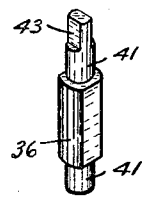
Fig. 4 is a detached view in perspective of a detail of the invention.
Figure 3:
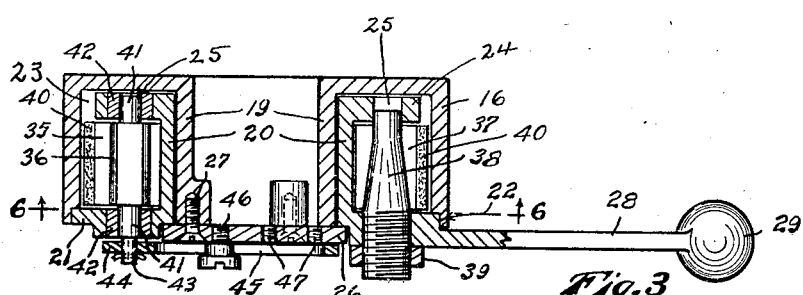
Fig. 3 is a view in cross section substantially on broken line 3, 3 of Fig. 2.

The space between the points at which the brake is firmly applied by movement of the operating lever 28, in opposite directions from the position of rest under normal load is the space herein termed the neutral zone and such space may be varied by adjusting the position of the screw 46 in the holes 47 it being apparent that if such screw which forms a stationary fulcrum for the lever arm 44 is moved further away from the center or axis about which the bracket that carries the cam 36 rotates it will cause a greater amount of turning movement to be imparted to the cam in proportion to a given turning movement of the operating lever: For instance, if the screw 46 is positioned so that it will be between the center of the drum 16 and the cam 36 when all parts are in their normal position of rest as shown in Figs. 1 and 2 any movement of the operating lever 28 will turn the lever arm 44 through a certain angle differing from the angle through which the operating lever is turned, see broken line position in Fig. 2. If the screw 46 is moved closer to the cam 36 the lever arm 44 will be turned through a greater angle in response to the same movement of the operating lever. If the screw 46 is moved further away from the cam 36 and closer to the center of the housing 16 the lever arm 44 will be turned through a lesser angle in response to the same movement of the operating lever. Thus it will be understood that if the screw 46 is moved from the position shown in Fig. 2 toward the cam 36 the scope of the neutral zone will be decreased and if such screw 46 is moved to a greater distance from the cam 36 the scope of the neutral zone will be increased.

The cam 36 of the form shown in Fig. 6 and the cam 50 of the form shown in Fig. 9 are both substantially true circles on their rounded or noncontacting sides so that a relatively slight turning movement of the cam will expand the brake shoes to a maximum and such brake shoes will remain fully expanded but will not be set tighter in response to further turning movement of the cam. As the cams are turned back from an extreme position toward the normal position they will hold the brake shoes fully expanded until they reach the limit of the neutral zone and will then release quickly but not instantaneously, the object of the particular shape of the cams being to cause the brake shoes to take hold and release as quickly as possible at the limits of the neutral zone without producing a shock or strain and to establish a maximum expansion beyond which the brake shoes can not be moved by further turning of the lever, thereby making it impossible to set the brakes tightly enough to lock the device and prevent it from coming back to the normal position.

In the normal position of rest the operating lever 28 will be substantially at right angles to the link 30 and the effective lever arm through which the vehicle spring is acting to move the brake will be at its maximum but as the operating lever 28 is moved above or below the normal position of rest the effective lever arm through which the force of the spring is being exerted against the brake will gradually be lessened, thus causing the effective retarding force of the brake to increase gradually in response to further movement of the operating lever after the brakes are set to the maximum by the full expansion of the brake shoes and to decrease gradually as the operating lever moves from an extreme angular position back toward the neutral zone. Thus it will be seen that this device offers the greatest resistance at the point of maximum deflection of the spring or of maximum rebound of the parts connected with such spring.

From the above description it will be seen that this spring brake will not interfere with the free and easy movement of the vehicle spring while the vibrations of such spring are within the limits of the neutral zone but that the spring brake will exert a retarding effect on any movements of the spring that are outside the limits of the neutral zone.

Figure 11:
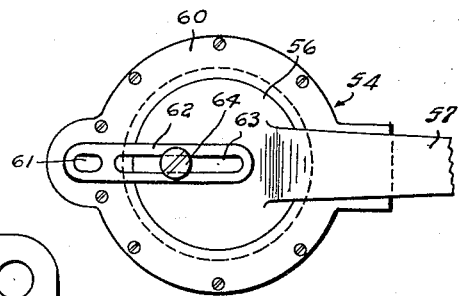
Fig. 11 is a view in elevation on a reduced scale showing the exterior of the device shown in Fig. 10.
Figure 10:
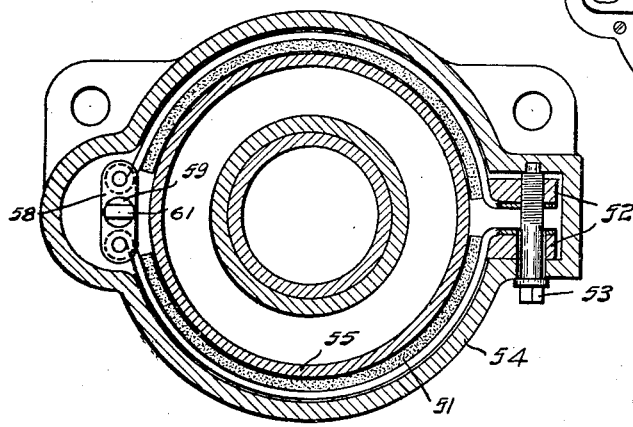
Fig. 10 is a sectional view of a modified form of spring brake.

In Figs. 10 and 11 we have shown a modification of the invention in which semi-circular brake shoes or bands 51 are adjustably secured as by blocks 52 and screw 53 to a fixed housing 54 and are arranged to be contracted on a movable drum 55 which is secured to a cover plate 56 that has a rigidly connected operating lever 57 that corresponds to the operating lever 28, of the previously described apparatus. The ends of the brake bands 51 opposite the anchor screw 53 are connected with each other in the manner shown by shackles 58 that are provided with a rigid stud 59 which projects outwardly through an end plate 60 on the housing 54 and terminates in a flattened end 61 that is connected with a lever arm 62, having a longitudinally extending slot 63 that fits slidably over a rigid screw stud 64 in the cover plate 56. When the cover plate is turned the lever arm 62 will be moved into an angular position thereby turning the shackle links and contracting the brake bands 51 on the drum 55. Slight clearance is provided between the brake bands 51 and drum 55 so that the brake bands will not be applied to the drum until after the actuating arm 57 has been moved through a predetermined angle, thus providing a neutral zone in the operation of the device.

In Fig. 12 we have shown a modification of the invention in which a fixed housing or drum 65 having a fixed centrally located cam member 66 is arranged to be engaged by a movable brake shoe 67 having adjacent rolls 68 at its ends that are adapted to be moved apart by a wedge 69 on an arm 70 that passes through a guide 71 and has a roller 72 on its inner end that rolls on the surface of the cam 66. The brake shoe 67 may be anchored to the moving parts by a pin or stud 73 arranged diametrically opposite to the wedge 69.

Fig. 13 shows a modification of the invention comprising a fixed housing 74 having a semi-circular brake segment 75 rigidly secured thereto in spaced relation from the walls thereof, said segment preferably being provided with a roughened exterior surface that is arranged to be engaged by the roughened interior surface of a movable brake segment 76 that is arranged to wedge between the segment 75 and the walls of the brake drum. The segment 76 may be moved by a lever arm 77, post 78 and operating lever 79 that are all rigidly connected with each other, the post 78 being mounted for rotation in the ends of the housing 74. A limited amount of movement from the position of rest is permitted before the movable segment 76 engages the fixed segment 75, thus providing a neutral zone in the operation of the device.

Fig. 14 shows a modified form of the invention in which a housing or drum 80 and a central cam 81 are relatively fixed or stationary and a brake shoe 82, flat springs 83, operating rods 84 and rollers 85 are movable within the housing 80 and around the cam 81 by means of an operating lever 86. A very slight clearance between the brake shoe 82 and drum 80 when the rollers are at the lowermost points on the cam, as shown, insures a neutral zone in the operation of the device. As the movable parts are turned the rollers 85 by engaging with the cam 81, expand the brake shoe 82 against the drum, thereby producing a retarding effect.

Fig. 15 shows a modification of the invention in which a housing or drum 87, springs, 88 and operating rods 89 having rollers 90 on the inner ends thereof are relatively fixed and a cam 91 and brake shoe 92 are movable relative to the fixed parts by an operating lever 93. The operating lever in this form of construction may be partly within the housing 87 and may project outwardly through a suitable opening in such housing, not shown. When the operating lever is moved the cam 91 will move the operating rods 89 outwardly, thus expanding the brake shoe 92 against the wall of the drum 87. A very slight clearance between the brake shoe 92 and drum 87 insures a neutral zone in the operation of the device.

The foregoing description, together with the accompanying drawing, clearly illustrates the form of construction and method of operation of this invention, but it will be understood that this disclosure is merely illustrative and that such changes in form, dimensions and arrangement of parts may be resorted to as are within the scope of the following claims:

What we claim is:

1. A spring brake for connection to the frame and axle of a spring supported vehicle, embodying brake means, having a constant neutral zone of operation corresponding to a predetermined normal vibratory movement between said frame and axle and in which it offers no resistance to said vibratory movement, said brake means being arranged to offer resistance to movement in either direction outside of said constant neutral zone.

2. A spring brake for connection to the frame and axle of a spring supported vehicle, embodying brake means having a neutral zone in which it offers no resistance to movement for a predetermined distance in either direction from a normal inoperative position, said neutral zone being constant with respect to said normal inoperative position, said brake means being arranged to offer resistance to movement in all directions outside of said neutral zone, said resistance increasing in response to movement away from said neutral zone and decreasing in response to movement toward said neutral zone.

3. A spring brake for connection to the frame and axle of a spring supported vehicle, embodying brake means, having a constant neutral zone of operation corresponding to a predetermined normal vibratory movement between said frame and axle and in which it offers no resistance to said vibratory movement, said brake means being arranged to offer resistance to movement in either direction outside of said constant neutral zone, and means for adjusting said spring brake to vary the amplitude of said neutral zone.

4. A spring brake for connection to the two relatively vibratory portions of a spring supported vehicle, embodying a brake housing arranged to be secured to one of said portions, an operating lever having one end pivotally connected with said housing, a link connecting the other end of said operating lever with said other vibratory portion, brake means disposed in said housing and connected with said operating lever, said operating lever having a normal inoperative position when said two vibratory portions are at rest and having a neutral zone constant with respect to said inoperative position, in which said brake means offers no resistance to movement for a predetermined distance in either direction from said inoperative position, said brake means being arranged to offer resistance to movements in all directions outside of said neutral zone.

5. A spring brake for connection to the frame and axle of a spring supported vehicle, embodying a cylindrical brake housing arranged to be secured to said frame, said housing including a brake drum, a brake shoe supporting bracket rotatably disposed within said housing, brake shoes disposed within said housing and movable with said bracket, an operating lever connected with said bracket, link means connecting said operating lever with said vehicle axle for moving said operating lever, and means governed by the movement of said operating lever for expanding said brake shoes against said brake drum.

6. A spring brake for connection to the frame and axle of a spring supported vehicle, embodying a cylindrical brake housing arranged to be secured to said frame said housing having an interiorly disposed brake drum, a brake shoe supporting bracket rotatably disposed within said housing, brake shoes disposed within said housing and movable with said bracket, an operating lever connected with said bracket, link means connecting said operating lever with the vehicle axle, a cam connected with said brake shoes and arranged to expand said brake shoes, and adjustable means for actuating said cam in response to movement of said operating lever.

7. A spring brake of the class described embodying a brake drum, a brake shoe supporting bracket rotatably disposed within said drum, semicircular brake shoes disposed within said drum and movable with said bracket, an operating lever connected with said bracket for turning the same, a cam rotatably mounted between adjacent ends of said brake shoes and arranged to be turned to expand said brake shoes quickly and then hold the same in a relatively fixed expanded position, a lever arm fixedly secured to said cam, and fulcrum means for said lever arm adjustable into various fixed positions with respect to said cam whereby the angular movement of the cam relative to the movement of the brake shoe supporting bracket may be varied.

8. A spring brake for connection to the frame and axle of a spring supported vehicle, embodying a cylindrical brake housing arranged to be secured to said vehicle frame and having an internal brake drum, semicircular brake shoes arranged to frictionally engage with said drum, an internal hub concentric with said housing, a brake shoe supporting bracket mounted for rotation within said housing and arranged to carry said brake shoes, relatively inclined surfaces on said brake shoes at one side of said brake drum, a tapered pin adjustable between said inclined surfaces, parallel end surfaces on said brake shoes at the other side of said brake drum, a cam rotatably interposed between said parallel end surfaces, an operating lever for turning said brake shoe supporting bracket, link means for connecting said operating lever to the vehicle axle, and means for turning said cam when said operating lever is moved.

9. A spring brake for connection to the frame and axle of a spring supported vehicle, embodying a cylindrical brake housing arranged to be secured to said vehicle frame and having an internal brake drum, semicircular brake shoes arranged to frictionally engage with said drum, two adjacent ends of said brake shoes being parallel to each other and the other two adjacent ends being inclined with respect to each other, an integral hub concentric within said housing, a brake shoe supporting bracket mounted for rotation within said housing and arranged to carry said brake shoes, a disk fixedly secured to said hub, a tapered pin adjustably disposed between the inclined ends of said brake shoes, a cam rotatably mounted between the parallel ends of said brake shoes, an operating lever for turning said brake shoe supporting bracket, link means for connecting said operating lever to the vehicle frame, a lever arm fixedly secured at one end to the end of said cam and rigid means on said fixed disk at a point removed from the center thereof for guiding said lever arm whereby said cam will be turned by movement of said operating lever.

Seattle, Wn. Dec. 8, 1921.
BENJAMIN F. SHIELDS.
CHARLES G. CROMBIE.
GEORGE A. WINDELL.